United States Patent [19]
Noguchi et al.

[11] 3,851,769
[45] Dec. 3, 1974

[54] INDUSTRIAL ROBOT

[75] Inventors: Kazuo Noguchi, Tokyo; Shigeru Iwai, Chiba; Yukihiro Sato, Tokyo; Yoshiaki Kitamura, Kamagaya-Machi, all of Japan

[73] Assignee: Kabushiki Kaisha Daini Seikosha, Tokyo, Japan

[22] Filed: Apr. 10, 1972

[21] Appl. No.: 242,565

[30] Foreign Application Priority Data
Apr. 9, 1971 Japan................................ 46-22149

[52] U.S. Cl........... 214/1 BC, 214/1 BD, 214/1 CM
[51] Int. Cl.............................................. B25j 9/00
[58] Field of Search .... 214/1 CM, 1 BC, 1 B, 1 BC, 214/1 BB

[56] References Cited
UNITED STATES PATENTS

| | | | |
|---|---|---|---|
| 2,973,106 | 2/1961 | Mezger | 214/1 BC |
| 3,306,442 | 2/1967 | Devol | 214/1 B |
| 3,454,169 | 7/1969 | Bridges | 214/1 CM |
| 3,543,947 | 12/1970 | Devol | 214/1 BC |
| 3,575,301 | 4/1971 | Panissidi | 214/1 BC |

FOREIGN PATENTS OR APPLICATIONS
1,652,959   6/1962   Germany .......................... 214/1 BB Primary Examiner—Robert G. Sheridan
Assistant Examiner—George F. Abraham
Attorney, Agent, or Firm—Robert E. Burns; Emmanuel J. Lobato; Bruce L. Adams

[57] ABSTRACT

A programmable industrial robot comprises a mechanical unit for effecting diverse movements of an object, and a control unit positioned at a remote location from the mechanical unit for controlling the movements of the mechanical unit in accordance with a predetermined and interchangeable program of instructions. The mechanical unit includes a gripper mechanism for releasably gripping an object, a pair of oscillatory fluid motors for angularly moving the gripper mechanism about two orthogonal axes, and a movable transfer arm connected to the gripper mechanism. A pair of reciprocatory fluid motors and an oscillatory fluid motor are connected to the transfer arm for linearly moving the transfer arm along two orthogonal axes and angularly moving same about one of the axes. The control unit is programmed by punch cards and includes an array of photoelectrical detectors for reading the punch cards and a logic circuit for deriving a series of comman signals in accordance with the information contained on the punch cards. The command signals are applied to a series of solenoid valves to accordingly control the actuation of the various fluid motors.

9 Claims, 4 Drawing Figures

INDUSTRIAL ROBOT

The present invention pertains to industrial robots and more particularly, relates to pneumatically powered industrial robots capable of performing various mechanical operations with a high degree of accuracy in accordance with programmed instructions.

Industrial robots are currently being used in numerous fields of technology to perform a variety of different operations. In particular, the precision machine industry has found many uses for industrial robots for automatically performing repetitive operations with a high degreee of precision. The use of industrial robots in place of human personnel has proven very beneficial and has resulted in both cost reduction and processing accuracy.

Many kinds of industrial robots have been devised for performing manipulations which were previously performed by human personnel. The use of such robots has saved industry many man-hours and has relieved many personnel from routine and dull jobs. Most of the currently available industrial robots are either electrically or hydraulically powered and are disadvantageous in that they provide a very limited degree and variety of movements and are costly to manufacture and maintain.

The electrically powered industrial robots have a comparatively short useful lifespan due primarily to the heavy loading to which the robot is subjected. In addition, the electrically powered robots cannot effect rapid movement of their robot arms because of the inherent time lag present in the electric drive motors and the associated circuitry and because of the large weight and inertia of the moving parts.

The hydraulically powered industrial robots are capable of actuating heavy loads but unfortunately, such robots are not well suited for use in the precision machinery industry because of their large size, slow speed, and low degree of positional accuracy. Moreover, the hydraulically powered robots occupy a relatively large space and have numerous mechanical connections thereby rendering them unsuitable for use in a compact or portable installation.

The prior art industrial robots have very restricted degrees of movement and are operable to perform only a very limited number of operations. Though these robots are intended to function much in the same manner as human hands, the conventional robots do not have the degree of flexibility and movement to perform human-like, three-dimensional movements which are often required in the precision machining industry. The conventional robots are restricted to comparatively simple transfer operations and usually are capable of only transferring an object from one point to another point.

The prior art industrial robots are also disadvantageous in that they possess a low degree of programmability and do not have sufficient memory capacity to meet the needs of present day robots. Most of the industrial robots in current use are programmed to perform various operations by either a pin-board or rotary-drum programming device.

In the pin-board system, a plurality of holes are provided on a control board and a series of control pins are inserted into the holes to electrically connect various circuits on the control board in accordance with a preselected program. Thus, the industrial robot is controlled by varying the positional array of the control pins in accordance with predetermined programming patterns.

The rotary-drum system employs a rotary drum having a plurality of cams arranged thereon in longitudinally spaced-apart relationship and a corresponding number of cam-actuated switches each positioned adjacent one of the cams. As the drum rotates, the cams selectively actuate the switches according to a predetermined program and the switches are electrically connected to suitable circuitry for accordingly controlling the operation of the robot.

The pin-board and the rotary-drum system are disadvantageous in that they require a relatively large amount of manual labor and time in order to change the program and therefore the interchanging of different programs requires a considerable amount of time and labor. The use of magnetic drums or other memory devices having a very large memory capacity are too expensive and therefore are not economically feasible for current industrial use.

It is therefore a primary object of the present invention to provide a programmable industrial robot capable of performing diverse movements according to a predetermined program and which is particularly well suited for use in the precision machinery industry.

Another object of the present invention is to provide a programmable industrial robot having a manipulator device for releasably gripping an object and angularly displacing the object and two mutually perpendicular axes and having a transfer arm connected to the manipulator device for linearly reciprocating the manipulator device along two mutually perpendicular axes as well as angularly moving the manipulating device about one of the axes.

It is a further object of the present invention to provide a programmable industrial robot whose movements are effected by a series of fluid motors controlled by electric command signals derived from programmed cards which may be easily interchanged to accordingly vary the movements of the industrial robot.

Still another object of the present invention is to provide a programmable industrial robot having an electric control circuit which selects certain external signals representative of various external conditions and thereby selects its own oriented working path determined by the dimensions or sizes of the workpieces to be handled.

A still further object of the present invention is to provide a programmable industrial robot which comprises a mechanical unit and a control unit detachably connected to each other by means of a connector so that the collective installation of the control units can be established to operate a plurality of corresponding mechanical units in synchronism with one another.

Yet another object of the present invention is to provide a programmable industrial robot provided with a safety device for terminating the operation of the robot in an emergency without advancing to the next step upon detection of an incomplete operation thereby making possible no-man operation.

According to the invention, the programmable industrial robot comprises a mechanical unit including a movable transfer arm and a manipulator device, and a control unit detachably coupled to the mechanical unit by means of a connector. The transfer arm effects horizontal, vertical and sweeping movements and the manipulator device effects turning and swinging movements as well as a gripping or chucking operation. The mechanical unit is pneumatically powered so that the industrial robot operates with high accuracy and high precision together with a broad versatility of motions. The control unit employs a series of servomechanisms instructed by the signals derived from a punch card wound around a rotary drum.

The above-mentioned objects and features of the invention will be more fully described in conjunction with the accompanying drawings illustrating the preferred embodiments of the industrial robot according to the present invention and in which.

Figure 1:
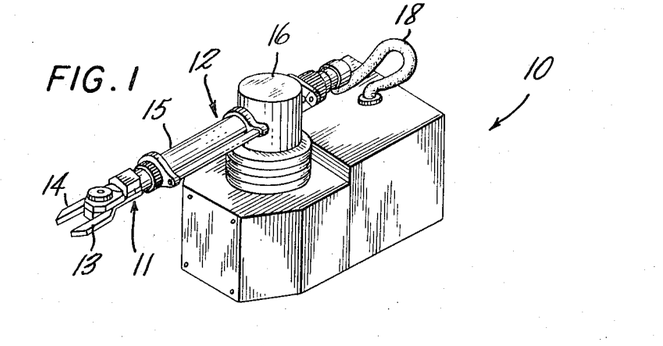
FIG. 1 is a perspective view showing a control unit of the industrial robot according to the present invention.
Figure 2:
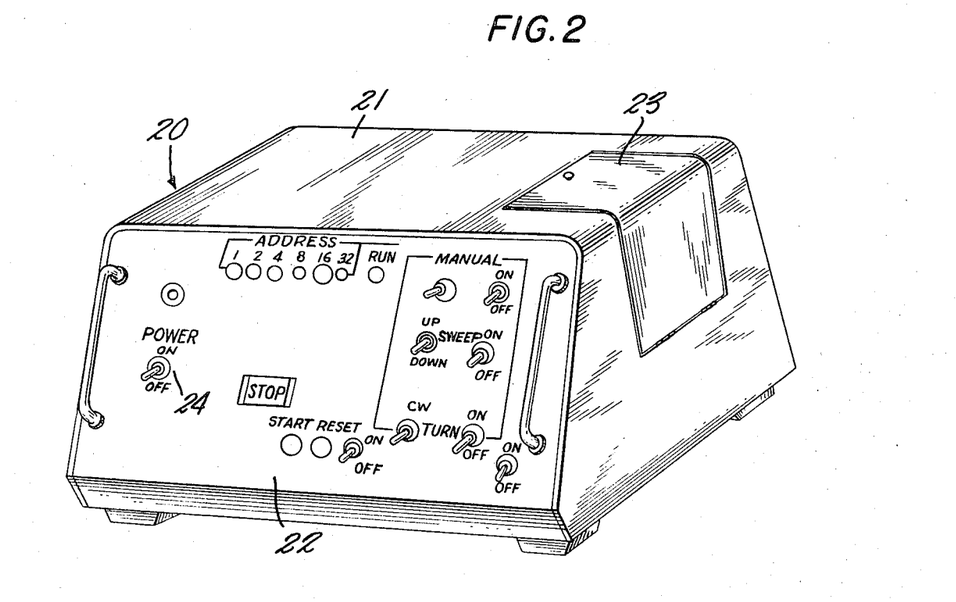
FIG. 2 is a perspective view showing a control unit of the industrial robot.

The industrial robot constructed in accordance with the principles of the present invention comprises a mechanical unit 10, shown in FIG. 1, and a control unit 20, shown in FIG. 2. The mechanical unit 10 comprises a manipulator device 11 for performing various manipulations and an accuator assembly 12 for actuating the manipulator device.

The manipulator device 11 is similar in construction to that described is commonly owned U.S. Pat. application Ser. No. 212,552, and therefore the manipulator device will not be described in detail in the present disclosure, reference being made to the related application for the details of the manipulator device. The manipulator device basically comprises a gripper mechanism for releasably gripping an object or workpiece and includes a pair of movable gripping jaws 13, 14 mounted for movement towards and away from each other to effect a gripping operation. The gripping jaws are mechanically connected together by a linkage system which is connected to a reciprocatory motor 280, shown in FIG. 4, for effecting actuation of the gripper mechanism.

Figure 4:
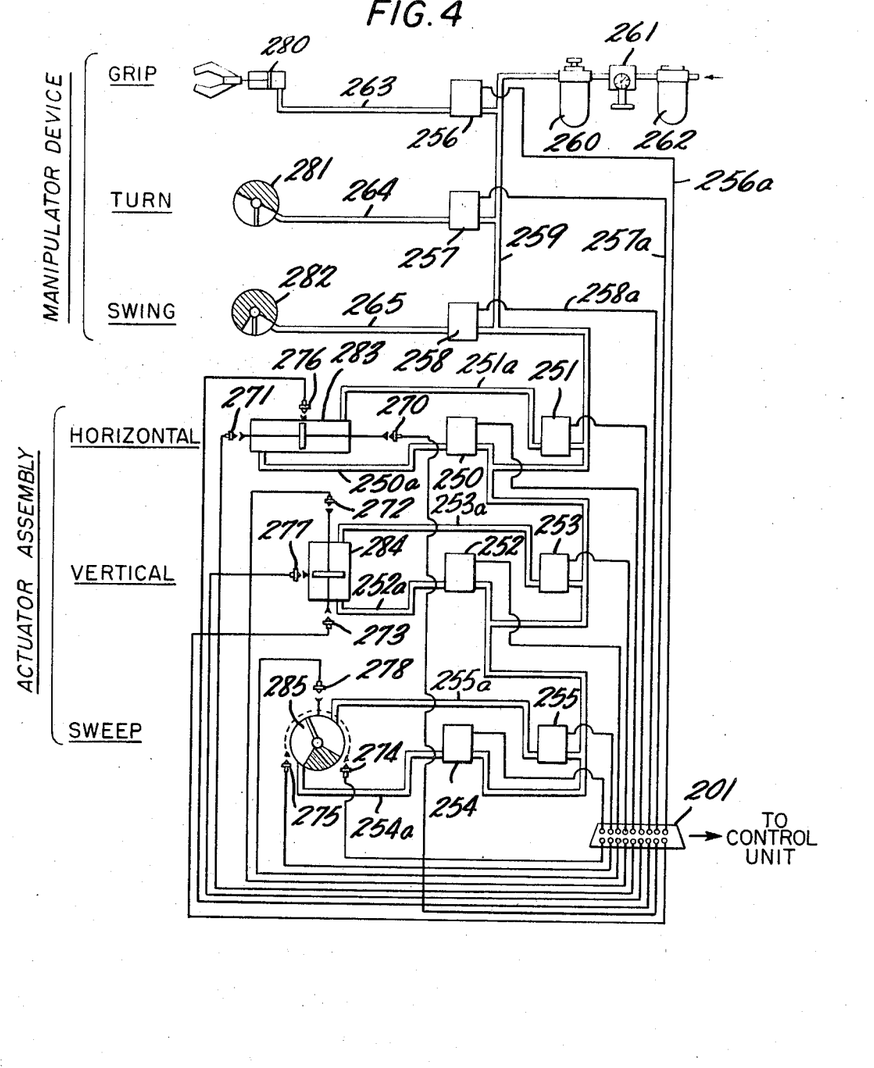
FIG. 4 is a schematic diagram of the air conduits and valves for effecting the various movements of the industrial robot.

Though not seen in FIG. 1, a pair of oscillatory fluid motors 281, 282 are connected to the gripper mechanism for oscillating the gripper mechanism about two mutually orthogonal axes. The oscillatory fluid motors are schematically shown in FIG. 4 and the motor 281 effects angular oscillatory movement of the gripper mechanism about a vertical axis whereas the oscillatory fluid motor 282 effects angular oscillatory movement of the gripper mechanism about a horizontal axis. The angular movement of the gripper mechanism about the vertical axis is hereinafter referred to as a turning movement whereas the angular movement of the gripper mechanism about the horizontal axis is hereinafter referred to as a swinging movement. The reciprocatory motor 280 and the two oscillatory motors 281, 282 are actuated by pressurized motive fluid and the control circuit for actuating the various motors will be described hereinafter.

The actuator assembly 12 is similar in construction to the actuator assembly disclosed in commonly owned U.S. Pat. application Ser. No. 212,344, now U.S. Pat. No. 3,777,618, and therefore the actuator assembly will not be disclosed in detail in the present disclosure, reference being made to the related application for the details of the actuator assemble. The actuator assembly comprises a movable transfer arm 15 which is connected at one end to the manipulator device 11, and a plurality of fluid motors are connected to the transfer arm for actuating the transfer arm. As seen in FIG. 1 as well as application Ser. No. 212,552, now U.S. Pat. No. 3,759,563, the two oscillatory motors 281, 282 and the reciprocatory motor 280 are all connected to the manipulator end of the transfer arm and are connected directly to the manipulator device in a compact arrangement.

A reciprocatory fluid motor 283, shown schematically in FIG. 4, is disposed interiorly of the transfer arm 15 and functions to horizontally reciprocate the manipulator device. A lifting and sweeping mechanism 16 is provided for raising and lowering the transfer arm along a vertical axis and for angularly displacing or sweeping the transfer arm about the vertical axis. Guide means 12 surrounds the lifting means and guides the vertical and angular movements of the lifting means along its intended path of travel.

As seen in FIG. 4, the lifting means comprises a reciprocatory fluid motor 284 for effecting vertical reciprocal movement and an oscillatory fluid motor 285 for effecting angular oscillatory movement referred to hereinafter as a sweeping movement. The two reciprocatory motors 283 and 284 along with the oscillatory motor 285 are actuated by pressurized motive fluid and the control circuit for actuating the various motors will be described hereinafter with reference to FIG. 4. The fluid motors 280 - 285 are independently operable relative to each other and are individually supplied with motive fluid through a series of flexible conduits contained within a main flexible conduit 18.

The control unit 20 functions to control the various movements of the mechanism unit 10 and more particularly, functions to control the gripping, turning and swinging movements of the manipulator device 11 as well as the horizontal, vertical and sweeping movements of the transfer arm 15. As seen in FIG. 2, the control unit comprises a housing 21 having on the front face thereof a control panel 22. On the control panel are a plurality of control switches which may be manually actuated to manually control the desired movements of the mechanical unit 10 in place of automatically controlling the movements by means of a predetermined program.

Positioned interiorly of the control unit 20 is a programming apparatus of the type disclosed in commonly owned U.S. Pat. application Ser. No. 210,947 for effecting actuation of the industrial robot in accordance with a preselected program. The details of the programming apparatus will not be set forth in detail in the present application, reference being made to the commonly owned and related application. The programming apparatus comprises generally a rotary drum having a transparent cylindrical surface, an array of miniature lamps positioned exteriorly of the drum, and a similar array of light-sensitive devices disposed interiorly of the drum in alignment with respective ones of the miniature lamps for generating an electrical output signal in dependenance upon the amount of light impinging thereon.

The rotary drum is dimensioned to receive therearound programmed punch cards which have holes punched therein arranged according to a predetermined program. For illustrative purposes, the program card will be considered to have information storage zones arranged along 40 vertical columns and 12 horizontal rows and therefore 12 sets of miniature lamps and light-responsive devices are required to read the information stored on the program card. The control unit 20 is provided with an operable cover member 23 which may be opened to insert the desired punch card onto the rotary drum.

The control unit 20 is physically separated from the mechanical unit 10 and the two units are interconnected by a flexible cord having the desired length. By such an arrangement, the mechanical unit 10 may be positioned at any location and moreover, a plurality of mechanical units 10 may be distributed around a work site and connected to a common control unit 20. By such an arrangement, the mechanical units may be installed at desired locations to perform human-like three-dimensional movements in accordance with the information contained on the programmed cards.

The mechanical portion of the control circuit is schematically shown in FIG. 4 and comprises a fluid control system for controlling the application of motive fluid to the various fluid motors. Since the industrial robot is small in size, constructed of light-weight materials, and designed for rapid movement, the motive fluid is preferably compressed air though other motive fluids may be used for effecting rapid actuation of the various motors.

The fluid control system comprises a main conduit 259 connected to an accummulator 260 for storing a quantity of motive fluid. The motive fluid, such as compressed air, is continuously supplied to the accumulator 260 through a filter 261 for filtering the fluid and a pressure regulator 262 for regulating the pressure of the motive fluid.

The reciprocatory fluid motor 280 comprises a single-acting motor which is spring-biased in one direction and fluid-actuated in the other direction. A branch conduit 263 interconnects the expansible working chamber of the reciprocatory motor 280 to the main conduit 259 and an electrically-operated solenoid valve 256 is positioned in the branch conduit to control the supplying and exhausting of motive fluid to the reciprocatory motor. The solenoid valve 256 is of conventional construction and functions when energized by an electrical command signal to move to an open position communicating the main conduit 259 with the branch conduit 263 and functions when deenergized to prevent such communication and instead open the conduit 263 to exhaust.

In a similar manner, the oscillatory fluid motors 281 and 282 are single-acting motors which are spring-biased in one direction and fluid-actuated in the opposite direction. The motors 281 and 282 are connected respectively through branch conduits 264 and 265 to the main conduit 259. Solenoid valves 257 and 258 are provided in the respective branch conduits 264 and 265 to control the application of motive fluid to the oscillatory motors in response to electrical command signals.

A somewhat similar arrangement is provided for the actuator assembly 12 except in this instance double-acting fluid motors are employed and therefore two sets of solenoid valves are needed to control the alternating movement of each motor. The reciprocatory fluid motor 283 comprises a cylinder having a piston reciprocally mounted therein. The piston divides the cylinder into two working chambers connected to the main conduit 259 through branch conduits 250a and 251a. A solenoid valve 250 is provided to control the supply and exhaust of motive fluid to one working chamber and a solenoid valve 251 is provided to control the supply and exhaust of motive fluid to the other working chamber.

The reciprocatory fluid motor 284 is similar in construction to the motor 283 and the two working chambers of the double-acting reciprocatory motor 284 are connected to the main conduit 259 through branch conduits 252a and 253a. Solenoid valves 252 and 253 respectively control the flow of motive fluid through the branch conduits 252a and 253a in response to electrical command signals.

The oscillatory fluid motor 285 comprises vane type oscillatory motor having two working chambers each connected to a branch conduit 254a and 255a. The branch conduits 254a and 255a are connected through respective solenoid valves 254 and 255 to the main conduit 259. Energization of the solenoid valve 254 supplies motive fluid to one working chamber whereupon the motive fluid is applied to one working face of the vane to effect angular sweeping movement of the transfer arm in one direction and energization of the solenoid valve 255 supplies motive fluid to the other working chamber to apply the motive fluid to the other working face of the vane to effect angular sweeping movement of the transfer arm in the other direction.

As seen in FIG. 4, the fluid motors 283, 284 and 285 are provided with stop switches actuated by the motors themselves to stop the transfer arm 15 at various predetermined locations. The reciprocatory motor 283 has a pair of normally open limit stop switches 270 and 271 positione to be actuated by the piston of the motor as same reaches the end of its stroke. The limit stop switches are actuated and closed by the piston rod as the piston approaches one of its end positions. In a similar manner, the reciprocatory motor 284 and the oscillatory motor 285 are provided respectively with appropriate sets of limit stop switches 272, 273 and 274, 275.

In addition to the limit stop switches, the motors are each provided with intermediate stop switches for stopping the motors at positions intermediate their end positions. An intermediate stop switch 275 is positioned along the path of travel of the piston associated with the reciprocatory motor 283 and similar intermediate stop switches 277, 278 are positioned along the paths of travel of the movable working members associated with the respective motors 284, 285. The intermediate stop switches are normally in their open position and are actuated to their closed position in response to movement of the working members. Though only one intermediate stop switch has been shown with each motor, it is clear that many such switches may be employed.

All of the stop switches and the solenoid valves are electrically connected to the connector assembly 201. The connected assembly is connected to the electrical portion of the control circuit by plugging into the control unit 20 and by such an arrangement, the various movements of the industrial robot are remotely controlled at the control unit 20.

Figure 3:
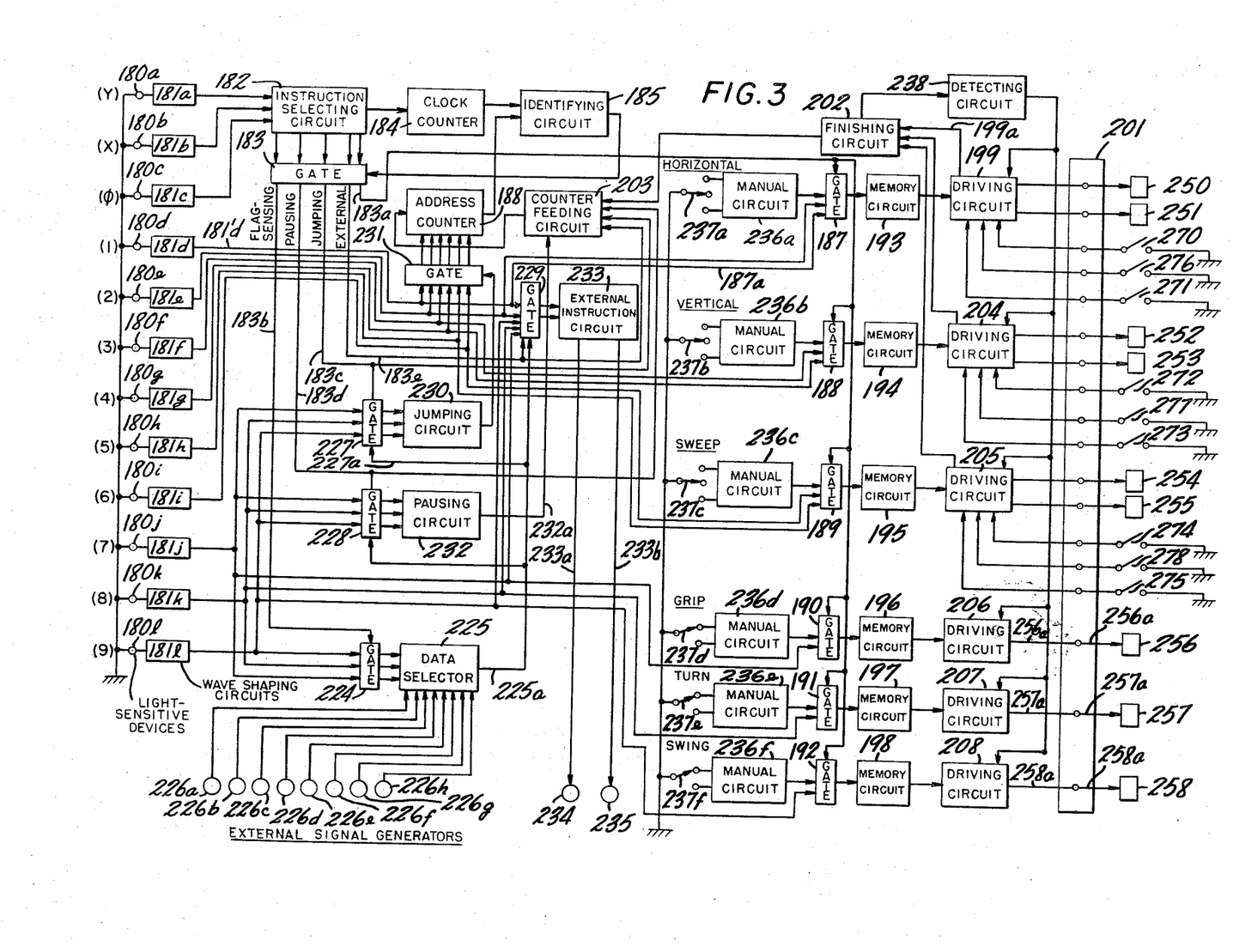
FIG. 3 is a schematic diagram of a control system for controlling the various movements of the industrial robot.

The electrical circuit for controlling the various movements of the industrial robot will now be described with reference to FIG. 3 which is a schematic view of one embodiment of an electrical logic circuit for controlling the actuation of the industrial robot. The punch card comprises, for example, 12 rows and 40 columns or steps of storage zones and the card is programmed with a series of holes punched in the storage zones in accordance with the desired instructions which are to be carried out by the industrial robot. The 12 punching positions per column are designated Y. X, $\phi$, 1, 2, 3, 4, 5, 6, 7, 8 and 9.

During operation of the industrial robot, the desired program card is wound around the rotary drum contained within the control unit 20 and then the drum is rotationally driven to derive control signals for controlling the operations of the robot. As the rotary drum revolves, the various punched holes in the program card rotate into the path of light emitted from the miniature lamps thereby enabling the light to impinge upon corresponding ones of the light-sensitive devices whereupon the light-sensitive devices generate electrical control signals corresponding to individual ones of the punched holes.

Twelve light-sensitive devices 180a – 180l are provided corresponding to the twelve punching positions per instruction column on the punch card. The light-sensitive devices comprise light-sensitive elements such as phototransistors, photovoltaic cells or other well-known photosensitive elements which provide an electrical output signal in dependence upon the intensity of the radiant energy received by the element.

A plurality of wave shaping circuits 181a and 181l are connected each to individual ones of the light-sensitive devices for trimming and shaping the electrical signals generated by the light-sensitive devices. The wave shaping circuits function to shape the electrical output signals into suitable pulses having sufficient amplitude and duration to operate the succeeding gate circuits. The outputs from the three wave shaping circuits 181a, 181b and 181c are fed to an instruction selecting circuit 182 which selects the signals transmitted from the zone areas Y, X and $\phi$ to selectively apply some of the signals to gate circuit 183 and for applying signals in the form of clock pulses or clock signals to a clock counter 184. The clock counter 184 counts the number of the address from the first to the last columns or steps of the punched program card.

An address counter 186 assigns the address to be next carried out and sends corresponding signals of the designated address to an identifying circuit 185. The identifying circuit generates an output signal which is fed to the gate 184 to open the gate circuit in response to receiving both the identified address signal from the clock counter 184 and the designated address signal from the address counter 186. The identifying circuit 185 produces one pulse per one revolution of the rotary drum and the assigned address of the address counter 186 corresponds to one of the sequence of addresses to be counted.

Now the sequence of operations will be described for effecting the horizontal, vertical and sweeping movements of the transfer arm 15 and the gripping, turning and swing motions of the manipulator device 11. The program card is punched such that row Y of the zone area is punched according to a predetermined address along with any of one or more of the rows 1 – 9 of the numeric area according to the desired operation of the transfer arm 15. When the address of the address counter 186 is identified with the above-mentioned address, the gate circuit 183 is opened to generate an output signal on the line 183a which is transmitted to the gates 187 – 192. A memory circuit 193 – 198 is connected to each of the gates 187 – 192 for storing the output signals applied to the gate circuits.

Assuming now that the row 1 defines the forward movement of the transfer arm 15 and that this column is punched in accordance with a preselected pattern of transfer arm movements, a signal is developed on the line 181'd and this signal is transmitted along a line 187a to the gate 187 to open the gate. When the gate 187 is opened, signal is applied to the driving circuit 199 to energize the solenoid valve 250. As seen in FIGS. 3 and 4, the connector assembly 201 connects the various output lines from the electrical circuit to the various switches and solenoid valves contained within the mechanical circuit.

As aforementioned, the solenoid valve 250 controls the supplying and exhausting of motive fluid to the reciprocatory motor 283 for effecting displacement of the piston accompanied by a corresponding movement of the transfer arm 15. The transfer arm 15 continues to move in the forward direction until the transfer arm effects closing of the limit stop switch 270 whereupon a stop signal is applied to the driving circuit 199 through the line 270a.

The driving circuit simultaneously generates a stop signal on the line 199a and applies to stop signal to a finishing circuit 202 which develops a corresponding signal and feeds same to a counter feeding circuit 203 which applies an appropriate signal to the address counter 186 to advance the address counter by one address whereupon same is in condition to receive the next instruction. The next instruction shown by a combination of punched holes in the following step or address of the program card is performed upon the identification of the next address by the identifying circuit 185 according to the random-access process.

The same sequence of operations are carried out when any one of the other rows 2 – 9 are assigned and these rows define respectively rearward, upward, downward, clockwise and counterclockwise movement of the transfer arm 15 and gripping, turning and swinging motion of the manipulator device 11. It should be noted that the assignment of the rows 1 and 2, 3 and 4, and 5 and 6 must be alternative since the instructions designated by these columns are contradictory with respect to the function to be carried out. In other words, since row 1 defines the forward movement of the transfer arms 15 and the row 2 defines the rearward movement of the transfer arm, these two instructions can not be simultaneously carried out since such would result in no movement at all of the transfer arm.

In a similar manner, the simultaneous assignment of two or more operations which are not contradictory to each other is permitted and such enables the robot to perform three-dimensional movement. For example, the rows 3, 5 and 8 may be simultaneously assigned since rows 3 and 5 respectively dictate the upward and clockwise movements of the transfer arm 15 and both of these movements may be simultaneously carried out whereby the transfer arm moves in a resultant vector direction of the upward and clockwise movements of the transfer arm 15 and both of these movements may be simultaneously carried out whereby the transfer arm moves in a resultant vector direction of the upward and vertical and clockwise sweeping directions. Likewise, the row 8 dictates the turning movement of the manipulator device and this motion may be carried out coincidently with the movements of the transfer arm.

In addition to the operational instructions for dictating the various mechanical movements to be performed by the robot, flag-sensing, jumping, pausing and external instructions may be programmed into the industrial robot. The following table shows the address portion of the punch card associated with each type of instruction.

| INSTRUCTION | ZONE AREA | | NUMERIC AREA |
|---|---|---|---|
| operational | Y | | 1 – 9 |
| flag-sensing | Y | X | 7 – 9 |
| jumping | | $\phi$ | 7 – 9 |
| pausing | X | | 7 – 9 |
| external | X | $\phi$ | 1, 2 and 7 – 9 |

The flag-sensing instruction is used to conform the program signals to any of a plurality of external conditions before the operation instruction is carried out. The punch card is punched in rows Y and X of the zone area and any of the numeric area rows 7 – 9.

During rotation of the rotary drum, the gate circuit 183 generates on the line 183b a signal which operates a gate circuit 224 to send the signals generated by the rows 7 - 9 to a data selector 225 to which external representative of external conditions are also applied from external signal generators 226a – 226h. If the data selector 225 detects no signals passing through the gate circuit 224 is being identified with any of the external conditions represented by the external signals, then no output signal is developes on the line 225a so that the next step can be performed. If a signal is detected, the data selector 225 transmits an output signal to the gate circuits 227 and 229.

More specifically, the flag-sensing instruction is performed where the object or workpiece to be handled by the robot is measured by a suitable instrument capable of generating external signals representative of the measurements taken and the object is to be orientated according to the measurement. The flag-sensing instruction conforms the external condition corresponding to the actual size of the workpiece to be transferred and is made in sequence until the data selector 225 catches the signal associated with the actual size of the workpiece. Then the operational instruction is effected to transfer the workpiece to the selected station.

In order to make the above-mentioned inquiries, the jumping instruction is made. The jumping instruction is programmed on the card by punching a zone area $\phi$ and numeric areas 7 - 9 and by assigning on any of the rows 1 - 6 the address to be next effected upon no comformation to one of the external signals.

The performance of the jumping instruction allows the gate circuit 183 to generate on the line 183c a signal which operates the counter feeding circuit 203 and opens the gate circuit 227. Accordingly, a jumping circuit 230 is operated to open a gate circuit 231 due to the signal from the data selector 225 on the line 227a whereby the address counter 186 is advanced to the address to be jumped according to the combination of the assignment present on the rows 1 - 6.

In addition, a pausing circuit 232 is provided in a similar electrical connection as the jumping circuit 230, and receives a signal from the gate circuit 228 by the signal on the line 183d from the gate circuit 183 and these signals are generated by punching the punch card at zone area X and rows 7 - 9 of the numeric area. The operation of the pausing circuit 232 causes the counter feeding circuit 203 to cease to operate by means of a lock signal appearing on the line 232a with the result that the robot puts an end to its function until the pause instruction is released.

Furthermore, the external instruction by which external machines or apparatuses are operated in coaction with the industrial robot is achieved by punching the punch card in rows X and $\phi$ of the zone area and any of rows 1 2, and 7–9 of the numeric area. By such an instruction, the gate circuit 229 is opened by the signal on the line 183e together with the signals from the wave shaping circuits 181d, 181e and 181j, 181l. An external instruction circuit 233 operates to generate signals on the lines 233a or 233b effect operation of the external terminal apparatus 234 or 235 in timed relationship with the movements of the robot.

To effect manual operation of the industrial robot according to the invention, manually energized circuits 236a – 236f are provided. Each of the circuits 236a – 236f is energized by manual switches 237a to 237f, respectively, and the circuits function to effect horizontal, vertical and sweeping movements of the transfer arm 15 and gripping, turning and swinging movements of the manipulator device 11. The manual switches are physically located at the control panel 22 of the control unit 20.

Furthermore, a detecting circuit 238 is provided to temporarily disable the driving circuits 199 and 204, 208 so as to stop their function for safety in the event of a malfunction.

Thus, it may be seen that the industrial robot according to the present invention in small in size, light in weight, and pneumatically powered and as a result of these features, the robot is portable and readily moved from place to place.

The industrial robot may be easily installed due to the simple arrangement of conduits for the supply of compressed air and the supply of electric power.

Furthermore, the industrial robot constructed in accordance with the invention is especially adapted for use in the field of precision machinery industry due to its high operating efficiency and programmability, small size, and diversity of movements. In one actual embodiment of the robot, the transfer arm was capable of undergoing wide three-dimensional movements and had a 150 mm horizontal stroke, 50 mm vertical stroke, and 220 degrees sweeping stroke and the manipulator device has a 180 degrees turning stroke and 90 degrees swinging stroke and all five movements were simultaneously carried out within the cycle time of half a second. In addition, the provision of the intermediate stop switches and end stop switches enabled the industrial robot to stop with a positional accuracy of 0.025 mm at any one of 27 positions provided at both ends and intermediate positions along each axis.

Moreover, the industrial robot according to the invention is controlled by the programmed sequence of instructions contained on a punch card and consequently the program may be easily changed and stored. The industrial robot is easily programmed to various instructions and each successive operation is inhibited until the completion of one instruction. The mechanical parts are prevented from being damaged when noman operation is being run due to the end stop switches and the detecting circuit. The working path of the object being worked on is selected from the judgement of external conditions to effect sophisticated operations in connection with a plurality of mutually synchronized robots.

Many modifications of the aforedescribed embodiment will be readily obvious to those skilled in the art and the present invention includes all such modifications falling within the scope and spirit of the invention as defined in the appended claims.

What we claim is:

1. A programmable robot comprising: a mechanical unit for effecting diverse movements of an object comprising a movable transfer arm mounted for movement in a plurality of different directions, a manipulator device including actuatable gripping means for releasably gripping an object and connected to said transfer arm at one end thereof for movement therewith and mounted for movement in a plurality of different directions independently of the movement of said transfer arm, and electrically controlled fluid actuating means for independently effecting fluid actuation of both said transfer arm and manipulator device in response to electric command signals applied thereto, said electrically-controlled fluid actuating means comprising a first plurality of fluid motors connected to said transfer arm each operative in response to motive fluid supplied thereto and exhausted therefrom to effect reciprocal movement of said transfer arm along a different axis, said first plurality of fluid motors comprising a first reciprocatory fluid motor connected to said transfer arm to effect horizontal reciprocal movement thereof along a horizontal axis and a second reciprocatory fluid motor connected to said transfer arm to effect vertical reciprocal movement thereof along the vertical axis, a second plurality of fluid-motors connected to said manipulator device each operative in response to motive fluid supplied thereto and exhausted therefrom to effect angular oscillatory movement of said manipulatory device about a different axis, said second plurality of fluid motors comprising a first oscillatory fluid motor mounted at said one end of said transfer arm and connected directly to said manipulator device to effect turning oscillatory movement thereof about a horizontal axis and a second oscillatory fluid motor mounted at said one end of said transfer arm and connected directly to said manipulator device to effect swinging oscillatory movement thereof about a vertical axis, and a fluid circuit connected during use of the robot to a source of pneumatic motive fluid and operable to selectively and independently supply and exhaust motive fluid to each of said fluid motors, said fluid circuit including at least one electrically-operated solenoid valve associated with each fluid motor for controlling the application of motive fluid thereto in response to said electric command signals; and a control unit for applying electric command signals to said mechanical unit in accordance with a predetermined program of instructions comprising signal generating means for generating electric control signals in accordance with a predetermined program of instructions to be carried out by said mechanical unit, and an electric circuit having means receptive of said control signals for developing therefrom a series of electric command signals in accordance with said predetermined program of instructions and applying said electric command signals to each solenoid valve to accordingly control the movement of said mechanical unit.

2. A programmable robot according to claim 1: wherein said control unit includes means receptive of a plurality of external signals representative of certain parameters of the object being moved for automatically varying said predetermined program of instructions according to said external signals.

3. A programmable robot according to claim 1, wherein said signal generating means comprises at least one punch card having means therein defining a pattern of holes arranged according to a predetermined program of instructions to be carried out by said robot, means mounting said punch card on said control unit for cyclical movement past a reading zone, and photoelectric reading means disposed in said reading zone for photoelectrically reading said pattern of holes in said punch card and providing corresponding electrical control signals.

4. A programmable robot according to claim 1; wherein said control unit includes manually-operated means for manually deriving said electric command signals.

5. A programmable robot according to claim 1; wherein said control unit includes means for automatically terminating the application of said electric command signals to said mechanical unit upon the detection of a malfunction.

6. A programmable robot according to claim 1; wherein said mechanical unit and control unit are physically separated from each other, and including a flexible connector releasably interconnecting said mechanical and control units and containing therein means for transmitting said electric command signals developed by said control unit to said mechanical unit.

7. A programmable robot according to claim 6; wherein said signal generating means comprises at least one punch card having means therein defining a pattern of holes arranged according to a predetermined program of instructions to be carried out by said robot, means mounting said punch card on said control unit for cyclical movement past a reading zone, and photoelectric reading means disposed in said reading zone for photoelectrically reading said pattern of holes in said punch card and providing corresponding electrical control signals.

8. A programmable robot comprising: a mechanical unit for effecting diverse movements of an object comprising a movable transfer arm mounted for movement in a plurality of different directions, a manipulator device including actuatable gripping means for releasably gripping an object and connected to one end of said transfer arm for movement therewith and mounted for movement in a plurality of different directions independently of the movement of said transfer arm, and electrically controlled fluid actuating means for independently effecting fluid actuation of both said transfer arm and manipulator device in response to electric command signals applied thereto, said electrically controlled fluid actuating means comprising three fluid motors all connected to said transfer arm at said one end thereof and connected directly to said manipulator device and independently operable to respectively effect angular oscillatory turning movement of said manipulator device about a first axis, angular oscillatory sweeping movement of said manipulator device about a second axis, and actuation of said gripping means, and three fluid motors connected to said transfer arm and independently operable to respectively effect reciprocal movement of said transfer arm along one axis, reciprocal movement of said transfer arm along another axis, and angular oscillatory sweeping movement of said transfer arm about said one axis, and electrically controlled valving means for selectively and independently applying motive fluid to each of said fluid motors in response to said electrical command signals; and a control unit for applying electric command signals to said mechanical unit in accordance with a predetermined program of instructions comprising signal generating means for generating electric control signals in accordance with a predetermined program of instructions comprising signal generating means for generating electric control signals in accordance with a predetermined program of instructions to be carried out by said mechanical unit, and an electric circuit having means receptive of said control signals for developing therefrom a series of electric command signals in accordance with said predetermined program of instructions and applying said electric command signals to said electrically controlled valving means to accordingly control the movement of said mechanical unit; whereby an object gripped by said gripping means may be moved through diverse movements according to said predetermined program of instructions.

9. A programmable robot according to claim 8; wherein said control unit includes means receptive of a plurality of external signals representative of certain parameters of the object being moved for automatically varying said predetermined program of instructions according to said external signals.

* * * * *